(12) United States Patent
Gudjonsson et al.

(10) Patent No.: US 7,774,241 B2
(45) Date of Patent: Aug. 10, 2010

(54) SIMULATION OF CONDITIONS IN A BATCHING PROCESS

(75) Inventors: Petur Gudjonsson, Reykjavik (IS); Magnus H. Rognvaldsson, Reykjavik (IS)

(73) Assignee: Marel HF, Gardabaer (IS)

( * ) Notice: Subject to any disclaimer, the term of this patent is extended or adjusted under 35 U.S.C. 154(b) by 877 days.

(21) Appl. No.: 10/578,863

(22) PCT Filed: Nov. 12, 2004

(86) PCT No.: PCT/IS2004/000019

§ 371 (c)(1),
(2), (4) Date: Jan. 16, 2007

(87) PCT Pub. No.: WO2005/047829

PCT Pub. Date: May 26, 2005

(65) Prior Publication Data

US 2007/0219878 A1    Sep. 20, 2007

(30) Foreign Application Priority Data

Nov. 14, 2003    (IS)    ............................................. 7038

(51) Int. Cl.
*G06Q 10/00*    (2006.01)
*G06F 17/50*    (2006.01)
(52) U.S. Cl. .......................................... 705/28; 703/13
(58) Field of Classification Search ........................ None
See application file for complete search history.

(56) References Cited

U.S. PATENT DOCUMENTS

| 3,945,448 | A | | 3/1976 | Sellers | |
|---|---|---|---|---|---|
| RE31,023 | E | * | 9/1982 | Hall, III | ........................ 405/37 |
| 4,413,739 | A | | 11/1983 | Kohashi | |
| 2003/0135354 | A1 | * | 7/2003 | Gabele et al. | .................. 703/13 |
| 2007/0005266 | A1 | * | 1/2007 | Blevins et al. | ................. 702/22 |

FOREIGN PATENT DOCUMENTS

| WO | 96/08322 | 3/1996 |
|---|---|---|
| WO | 00/00036 | 1/2000 |
| WO | 00/23772 | 4/2000 |
| WO | 03/069285 | 8/2003 |

* cited by examiner

*Primary Examiner*—F. Ryan Zeender
*Assistant Examiner*—Faris Almatrahi
(74) *Attorney, Agent, or Firm*—Nixon & Vanderhye P.C.

(57) ABSTRACT

The present invention relates to a method and an apparatus for batching items (9, 11) of non-uniform weight into batches fulfilling certain weight criteria. The items (9, 11) are conveyed across a scale (10) registering the weight of each item individually, and subsequently, the items (9, 11) are combined into batches. In particular, the invention relates to a method of analyzing process deviations in a batching process, e.g. to detect faults in a batching system or in order to improve a batching process flow. One sophisticated application of the invention is to include a simulation of the batching process to accurately predict the results for the pack-sizes on demand and recommend the optimal ones to the operator.

21 Claims, 10 Drawing Sheets

Production list

Figure 1:
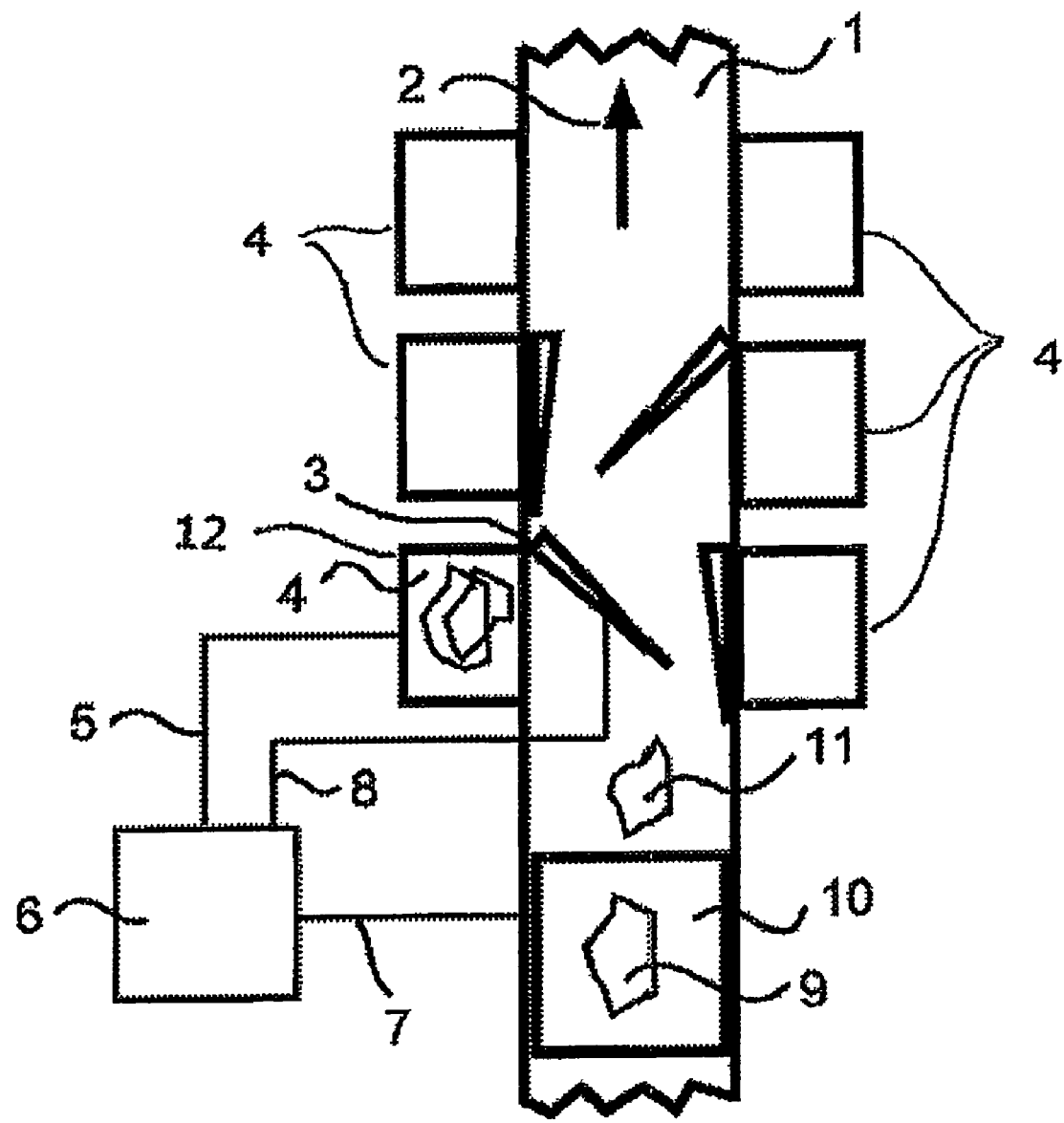

Period : 9/7/2003-9/13/2003
Product group= Walmart Exact Weight, Product description

| Product description | Input weight | Final weight | Weight share | Total reject | Batch reject | Final reject |
|---|---|---|---|---|---|---|
| 78038 10T BLB | 178,775 | 180,438 | 14.69% | 0.93% | 7.40% | 23.99% |
| 78039 10T BLS Thighs | 0 | 23,541 | 1.92% | 0.00% | 0.00% | 17.72% |
| 78615 6T BLB | 80,937 | 82,104 | 6.68% | 1.44% | 4.46% | 16.68% |
| 78647 15T Thighs | 60,958 | 46,707 | 3.80% | -23.36% | 4.29% | 26.41% |
| 78648 6T Wing Portion | 0 | 3,214 | 0.26% | 0.00% | 0.00% | 13.09% |
| 78705 DBL Bag WB | 283,928 | 0 | 0.00% | -100.00% | 1.47% | 0.00% |
| 78772 10T Splt Brst | 53,803 | 43,800 | 3.55% | -18.66% | 3.16% | 23.43% |
| 78773 10T Drums | 53,738 | 145,769 | 11.87% | 171.26% | 2.48% | 26.74% |
| 78774 10T Thighs | 91,966 | 81,611 | 6.64% | -11.26% | 4.09% | 19.31% |
| 78775 10T Wings | 158,804 | 141,688 | 11.54% | -10.78% | 7.35% | 26.68% |
| 78782 10T LQ1/4 | 25,759 | 65,868 | 5.36% | 155.71% | 2.02% | 20.72% |
| 78803 4T SKN Splt Brst | 18,420 | 8,331 | 0.68% | -54.77% | 4.35% | 44.48% |
| 78806 4T Splt Brst | 23,816 | 14,975 | 1.22% | -37.12% | 1.37% | 18.03% |
| 78808 3T Drums | 0 | 33,386 | 2.72% | 0.00% | 0.00% | 13.99% |
| 78809 3T Thighs | 18,293 | 16,805 | 1.37% | -8.14% | 6.89% | 19.62% |
| 78810 3T Wings | 15,307 | 19,089 | 1.55% | 24.70% | 12.60% | 22.36% |
| 78828 6T Splt Chx | 0 | 1,127 | 0.09% | 0.00% | 0.00% | 0.00% |
| 78829 3T BLB | 109,392 | 107,281 | 8.73% | -1.95% | 7.87% | 17.44% |
| 78830 6T WHL Cutup | 0 | 15,538 | 1.27% | 0.00% | 0.00% | 67.67% |
| 78865 3T BLB Thighs | 0 | 17,185 | 1.40% | 0.00% | 0.00% | 24.20% |
| 78871 25T Splt Brst | 38,800 | 35,026 | 2.85% | -9.73% | 2.87% | 17.28% |
| 78872 15T Drums | 94,848 | 29,805 | 2.43% | -68.58% | 2.85% | 17.54% |
| 78874 25D WING | 98,977 | 85,629 | 6.97% | -13.40% | 6.80% | 20.63% |
| 78935 10T CLP Tender | 0 | 10,232 | 0.83% | 0.00% | 0.00% | 26.09% |
| 78938 3T Tender | 0 | 19,376 | 1.58% | 0.00% | 0.00% | 16.32% |
| | 1,416,420 | 1,228,304 | 100.00% | -13.28% | 4.56% | 23.61% |

Fig. 6

Overpack list

Period : 9/7-2003-9/13/2003
Product group= Walmart Exact Weight, Product description

| Product description | Total boxes | Total packs | Total weight (lb) | Overpack total (lb) | Nominal weight (lb) | Overpack per pack (lb) | Overpack ratio | Pieces per pack |
|---|---|---|---|---|---|---|---|---|
| 78038 10T BLB | 1,967 | 29,500 | 180,438 | 3,143 | 6.010 | 0.107 | 1.77% | 11.8 |
| 78615 8T BLB | 0 | 26,359 | 82,104 | 2,503 | 3.020 | 0.095 | 3.14% | 6.1 |
| 78647 15T Thighs | 0 | 9,207 | 46,707 | 488 | 5.020 | 0.053 | 1.06% | 12.5 |
| 78772 10T Splt Brst | 0 | 7,773 | 43,600 | 693 | 5.520 | 0.089 | 1.61% | 6.2 |
| 78773 10T Drums | 0 | 24,858 | 145,769 | -16,292 | 6.520 | -0.655 | -10.05% | 16.2 |
| 78774 10T Thighs | 0 | 12,389 | 81,611 | 835 | 6.520 | 0.067 | 1.03% | 16.6 |
| 78775 10T Wings | 0 | 19,845 | 141,688 | 1,675 | 7.020 | 0.094 | 1.20% | 23.9 |
| 78782 10T LQ1/4 | 0 | 12,761 | 65,868 | -23,459 | 7.000 | -1.838 | -26.26% | 7.1 |
| 76803 4T SKN Splt Brst | 0 | 3,396 | 8,331 | 844 | 2.270 | 0.190 | 8.38% | 3.0 |
| 78806 4T Spl Brst | 0 | 5,889 | 14,875 | 135 | 2.520 | 0.023 | 0.91% | 3.0 |
| 78809 3T Thighs | 0 | 7,916 | 16,805 | 814 | 2.020 | 0.103 | 5.09% | 5.5 |
| 78810 3T Wings | 0 | 8,959 | 19,068 | 981 | 2.020 | 0.111 | 5.47% | 7.9 |
| 78829 3T BLB | 0 | 60,760 | 107,261 | 6,399 | 1.660 | 0.105 | 6.34% | 3.6 |
| 78871 25T Splt Brst | 0 | 8,248 | 35,026 | 537 | 5.520 | 0.088 | 1.56% | 6.1 |
| 78872 15T Drums | 0 | 6,525 | 29,805 | 312 | 4.520 | 0.048 | 1.08% | 11.8 |
| 78874 25D WING | 0 | 18,535 | 85,629 | 1,851 | 4.520 | 0.100 | 2.21% | 16.6 |
|  | 1,967 | 261,007 | 1,104,704 | -18,732.25 |  |  | -1.67% |  |

Fig. 7

Overpack correlation

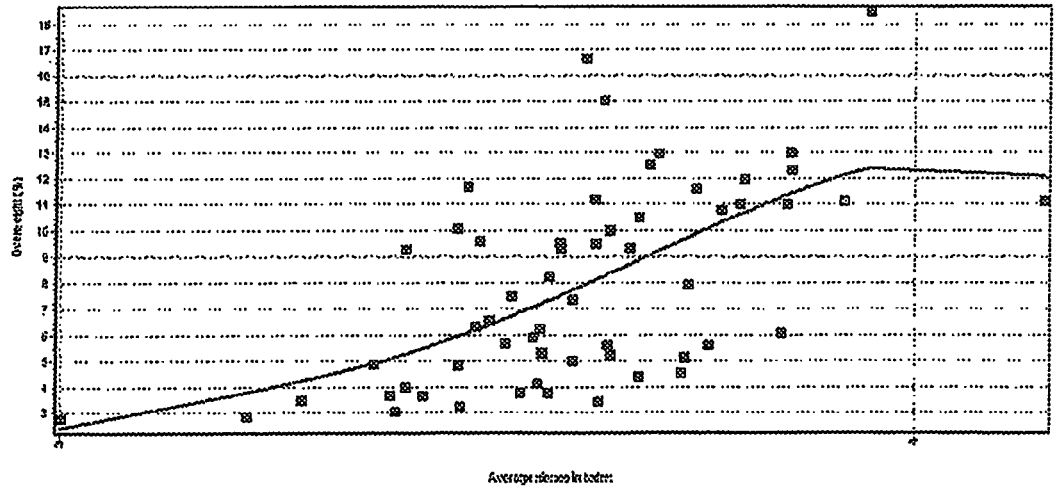

Fig. 8

Product by period

Period: 9/11/2003-9/11/2003
Product= 78829 3T BLB

| Product:<br>Period | 78829 3T BLB<br>Process unit | Start of period | End of period | Batch count | Final weight (lb) | Overpack (%) |
|---|---|---|---|---|---|---|
| 10382 | Sys 8 BBGL | 9/11/2003 4:45:24 AM | 9/11/2003 7:57:52 AM | 2 | 1 | 0.00% |
| 10393 | SYSTEM 8 L | 9/11/2003 4:45:37 AM | 9/12/2003 4:45:35 AM | 4809 | 8,309 | 8.61% |
| 10394 | SYSTEM 8 R | 9/11/2003 4:45:38 AM | 9/12/2003 4:45:36 AM | 4485 | 7,713 | 4.06% |
| 10395 | SYSTEM 10 | 9/11/2003 4:45:39 AM | 9/12/2003 4:45:37 AM | 1027 | 1,817 | 8.61% |
| 10418 | Sys 8 BBGL | 9/11/2003 7:57:52 AM | 9/11/2003 10:16:22 AM | 510 | 873 | 0.00% |
| 10420 | Sys 8 BBGR | 9/11/2003 8:07:12 AM | 9/11/2003 10:17:17 AM | 480 | 816 | 0.00% |
| 10431 | Sys 8 BBGL | 9/11/2003 1:01:02 PM | 9/11/2003 5:02:57 PM | 2175 | 3,680 | 0.00% |
| 10432 | Sys 8 BBGR | 9/11/2003 1:02:52 PM | 9/11/2003 5:02:22 PM | 1519 | 2,556 | 0.00% |
| 10438 | Sys 8 BBGR | 9/11/2003 5:02:22 PM | 9/11/2003 5:18:47 PM | 6 | 10 | 0.00% |
| 10440 | Sys 8 BBGR | 9/11/2003 5:18:47 PM | 9/11/2003 9:56:03 PM | 1187 | 2,010 | 0.00% |
| 10450 | Sys 8 BBGL | 9/11/2003 9:56:27 PM | 9/12/2003 4:45:21 AM | 4957 | 8,829 | 0.00% |

Fig. 12

SIMULATION OF CONDITIONS IN A BATCHING PROCESS

This application is the U.S. national phase of International Application No. PCT/IS2004/000019 filed 12 Nov. 2004, which designated the U.S. and claims priority to IS 7038 filed 14 Nov. 2003, the entire contents of each of which are incorporated herein by reference.

INTRODUCTION

The present invention relates to a method and an apparatus for batching items of non-uniform weight into batches fulfilling certain weight criteria. The items are conveyed across a scale registering the weight of each item individually, and subsequently, the items are combined into batches, e.g. based on statistical methods for obtaining minimum overweight or underweight in relation to the weight criteria. In particular, the invention relates to a method of analyzing process deviations in a batching process e.g. to detect faults in a batching system or in order to improve a batching process flow, e.g. by re-organizing the order in which the products are processed. A typical application utilizing the present invention would measure a characteristic of items in the process and visually present the characteristics of these items along with the results of the batching process to an operator in a way so that the batching process may be improved. A more sophisticated application of the present invention would include a simulation of the batching process to accurately predict the results for the pack-sizes on demand and recommend the optimal ones to the operator.

BACKGROUND OF THE INVENTION

In various industries, items are sold in batches satisfying various constraints. As an example, items of non-uniform size, shape or weight, e.g. food items such as meat, fish, fruit and vegetables, are typically handled and delivered to customers in batches having a substantially uniform size, shape and weight. Typically, a batch of items must fulfill requirements defined by a contract between a delivering and a receiving part, and most often, minimum weight of the batch is a key issue. Normally, the part of the batch that exceeds the minimum weight is considered by the delivering part as a loss and is often referred to as "giveaway", "overweight" or "overpack".

Typically, batches are formed by weighing the items individually, e.g. as they are moved by a conveyer system across a dynamic scale. In a computer system, the weight of each item is compared with weights of a plurality of receptacles, e.g. bins wherein batches are formed. Often, the computer system uses statistical algorithms for assigning specific items to specific bins under consideration of required minimum weight of the batch and a desire not to produce batches with more overweight, i.e. giveaway, than required under the present conditions, i.e. given the weights of the items and the required minimum weight of the batches.

Evidently, there is a correlation between the amount of giveaway, the required minimum weight of the batches, and the weight distribution of the items being batched. In general, the larger the items are and the smaller the batches are, the more giveaway is expected.

Existing systems for batching items, e.g. conveyor systems for continuous batching of food items, are sometimes provided with a computer system, which is capable of registering certain process parameters, e.g. the batching throughput, e.g. determined in weight units or determined in numbers of pieces per time unit. It is, however, very difficult even for skilled operators to evaluate the performance of the system. As an example, an operator may be satisfied by knowing that a large number of batches are formed within a certain time unit, while he never realizes that the amount of giveaway or the amount of batches with underweight is large, and even if control weighing of the batches reveals the truth, the complex nature of the batching process makes it difficult to determine the reason for the large number of batches with overweight or underweight, neither to say if the situation is better or worse than expected. One reason for an undesirable result could be that the weight distribution of the items is not suitable for the batch or pack size being processed and another reason could be that a scale is out of order. In the existing systems for batching, it is therefore difficult to optimize the batching process, e.g. with the objective to minimize giveaway.

DESCRIPTION OF THE INVENTION

It is an object of a preferred embodiment of the present invention to enable better control of a batching process. Accordingly, the present invention, in a first aspect, provides an integrated item batching and information handling system for producing batches of items, said system comprising:
- a process flow line with item batching means arranged between an item intake and at least one batch receptacle,
- first sensing means for establishing data representing characteristics of items entering the intake, and
- a computer adapted, for a given batching principle to:
- generate a first set of data representing characteristics of a first reference set of items of a type similar to the items entering the intake, and corresponding characteristics expected for batches of the first set of items.

During operation, the first set of data may be provided to an operator of the batching system for visualizing the characteristics that could be expected for batches batched from the items, i.e. as a reference for the actually ongoing batching. Accordingly, the operator is supported when determining the conditions of the system and the process of batching the items, and the operator has the opportunity to interfere, e.g. when the first set of data deviates a lot from the results achieved in the system, i.e. the characteristics of the batches obtained during batching of the items.

The items could e.g. be food items of non-homogeneous size, shape, color, weight etc.

The process flow line could be a conveyor based flow line wherein items arrive, e.g. from a previous process line, at a scale or similar sensor for determining a characteristic feature of the product. From the sensor, the item is conveyed towards a batching system comprising a plurality of batch receptacles with corresponding rejecting arms each being arranged to reject items from the conveyor to a receptacle. The first sensing means could be adapted to sense the color, size, shape, weight etc. of the items. As an example, the sensing means could be a scale, e.g. an electronic scale or weighing machine capable of transmitting an electronic signal representative of the weight of the receptacle, e.g. a dynamic scale capable of sensing the weight of the items, while they are conveyed across the scale, or the sensor could comprise a vision system for detecting size or shape of an item.

The generation of the first set of data may take place simultaneously with the batching of items and the data may be regularly updated. Usually, the first set of data would be generated as early in the process as possible. The first set of data may also be a data set, which is generated only once, e.g. in connection with installation of the system. The characteristics of the items could relate to the above mentioned sensing variables, i.e. a color, a quality parameter or to the weight, size or shape of the item. Correspondingly, the characteristics of the batch could relate to a color, a quality parameter, the total weight of the batch, the size or shape of the batch or to an overweight or an underweight of the batch. As an example, the first set of data can be generated, e.g. by the computer prior to installation of the system, or as a part of an installation procedure or during the first days of operation of the plant. The first set of data could comprise an average value of the weights of items, which are expected to arrive and an average value of overweight, which must be expected for given values of batch weights. The first set of data may be obtained, e.g. from historical data describing previous batching of similar items.

In order to compare the characteristics of actually entering items with the first data set, the computer could receive the data from the first sensing means and generate a second set of data representing characteristics of items entering the intake. Based on the received data, the computer may calculate expected conditions of batches resulting from batching of the items entering the intake. The calculation could be based on an average item weight, a number of batch receptacles and a desired end weight of the receptacles, and may return an average overweight of the receptacles.

To compare the characteristics of actually formed batches, e.g. for controlling the batching process, the system may further have second sensing means for establishing data representing characteristics of the at least one batch receptacle. Data, which the computer receives from the second sensing means, can be incorporated in a third set of data representing actual conditions of batches being batched. The second sensing means could sense the color, size, shape, weight etc. of the batch receptacles while they are being filled with items. As an example, the sensing means could be a scale, e.g. an electronic scale or weighing machine, capable of transmitting an electronic signal representative of the weight of the receptacle, or the sensing means may comprise a vision system for detecting size and/or shape of a batch.

The computer could be a regular PC or any similar electronic processor capable of processing data. As an example, the computer may comprise a central processing unit arranged to receive data from the first and the second sensing means. The computer may have additional processing units connected between at least one of the sensing means and the central processing unit. As an example, the first and/or the second sensing means may each have a processing unit capable of processing the data, e.g. data relating to the weight of the items or batch receptacles, and to process this data, e.g. to return a mean value or a standard deviation of the sensed characteristic.

An operator of the system could be allowed to key in data, e.g. representing characteristics of items, which are expected to be received in the future. The system may have a data storage and data entering means allowing entering of data sets into the data storage means. In one embodiment of the invention, the computer can generate a fourth set of data representing imaginary data, e.g. non-existing items, and corresponding characteristics of batches expected for a theoretically ideal batching of the fourth set of items. The fourth set of data can be used by an operator of the system to determine how far away a presently ongoing batching process is from a theoretically optimal batching process, e.g. a batching process, wherein the equipment is assumed to function faultless, i.e. a situation, wherein the scales determines the weights exactly, wherein a rejecting arm never fails to reject an item into a receptacle, and wherein the characteristics of the items are expected to be within a certain statistical distribution.

Preferably, the system is provided with a conveyor for conveying the items from the intake and across the first sensor towards batching means, e.g. comprising rejecting arms, and into batch receptacles. As an example, the conveyor may be formed by an endless belt, an overhead connected line of shackles, or a plurality of adjacent rolls. Depending upon the sensing means, e.g. by incorporating a dynamic scale for weighing the items, the computer may generate and compare data sets during conveying of items across the scale.

In order to provide the operator of the system with easily understandable data, the computer may generate a correlation insignia representing a correlation between at least two of the data sets, e.g. between the first and second data set or between the first and third data set. As an example, the first data set may comprise historical data corresponding to the average weight of items entering the system and corresponding overweight of batches comprising these items. The correlation insignia could represent a correlation between this first data set and data representing average weight of presently batched items and corresponding overweight of the presently formed batches. As an example, the insignia could be defined as data from the first set of data divided with data from the second set to data, vise versa. Alternatively, the insignia could represent data from the first set of data minus data from the second set of data, vise versa.

The first correlation insignia is representative of a possible error in the system, e.g. if previously batched items gave batching results, which are far removed from the result of the presently ongoing batching, even though the average weights of the items are comparable. In this case, the possible error could be determined by studying correlation insignia fluctuations representing the difference between historical data comprised in the first set of data and weight data from the first and second sensing means comprised in the second and third sets of data. In order to use the first correlation insignia to find errors in the system or in general to evaluate the functioning of the system, the computer may generate a warning signal for an operator, e.g. in case the correlation insignia is outside a predetermined interval. The warning signal can be transmitted to the operator as a sound or light signal, as an SMS message, an e-mail, a phone call or in any similar way.

At least one of the first, the second, the third and the fourth sets of data can be visualized graphically on a computer screen, e.g. plotted into a Cartesian coordinate system, e.g. plotting average weight of items out of a vertical axis while average overweight of batches are plotted out of a horizontal axis, vice versa. In the same coordinate system, or in other coordinate systems, one or more of the correlation insignias may be plotted.

The first and the fourth sets of data may represent one of:
an average weight of the first set of items, and
a standard deviation of the first set of items, and one of:
a corresponding average overweight expected for batches of the first set of items, and
a number of batches expected to have an underweight.

Correspondingly, the second and the third sets of data may represent one of:
an average weight of the first set of items, and
a standard deviation of the first set of items.

In a preferred embodiment, the system can recalculate expected characteristics of batches based on user input and/or acquired data. As an example, the user can enter characteristics of items, e.g. an average weight of items, into the system, which then calculates expected characteristics of the batches, e.g. an average overweight. The calculation could be based on empirical data or an analytically determined mathematical function, i.e. the procedure could create a random set of items based on the characteristics entered (e.g. average weight, standard deviation and normal distribution), and then using the same algorithm to batch the created set of numbers as being used in the real world. The result is the expected characteristics of the batches.

According to a second aspect, the present invention relates to a method of analysing process data in a batching process of an integrated item batching and information handling system of the kind comprising a process flow line with item batching means arranged between an item intake and at least one batch receptacle, and first sensing means for establishing data representing characteristics of items entering the intake, said method comprising the steps of conveying items between an item intake and at least one batch receptacle in an item processing line, establishing data representing characteristics of items entering the intake, and generating a first set of data representing conditions of a first set of items, and corresponding conditions expected for batches of the first set of items.

In particular, the method is concerned with analysing weight data of a food processing equipment in accordance with any of the features described for the system according to the first aspect of the invention.

DETAILED DESCRIPTION OF THE INVENTION

Figure 2:
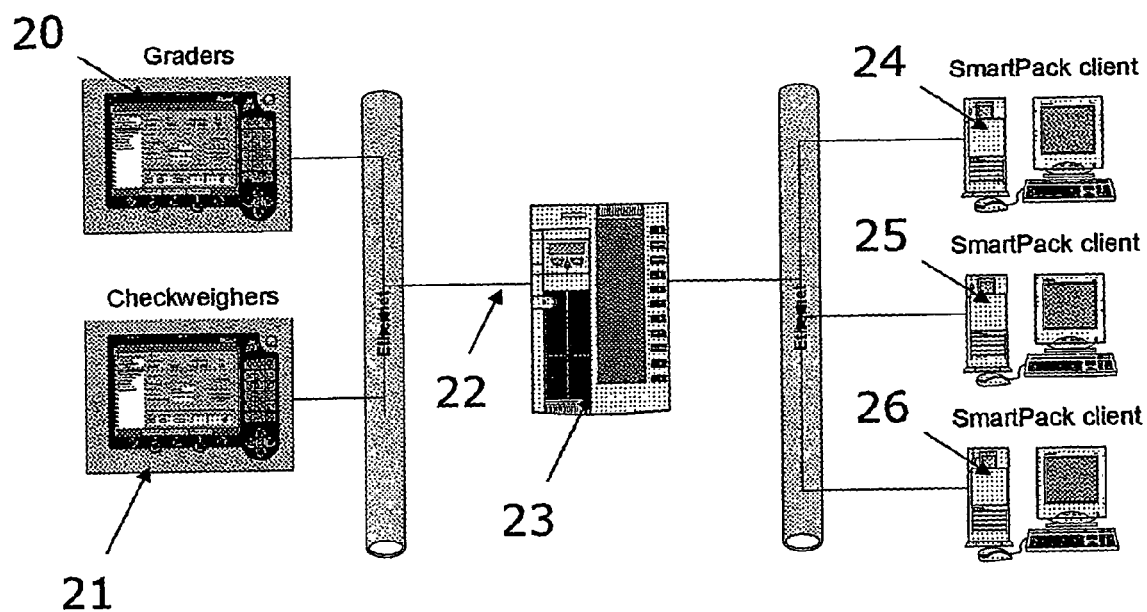
Figure 3:
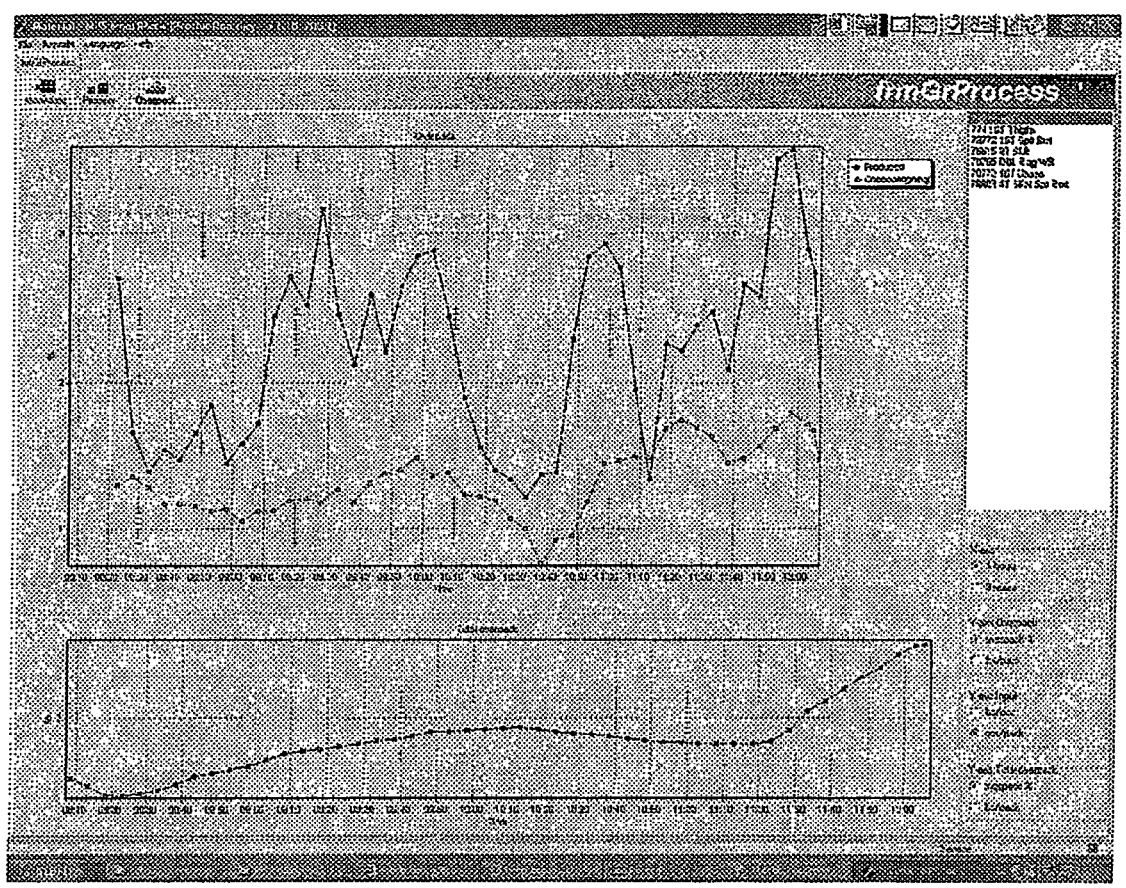
Figure 4:
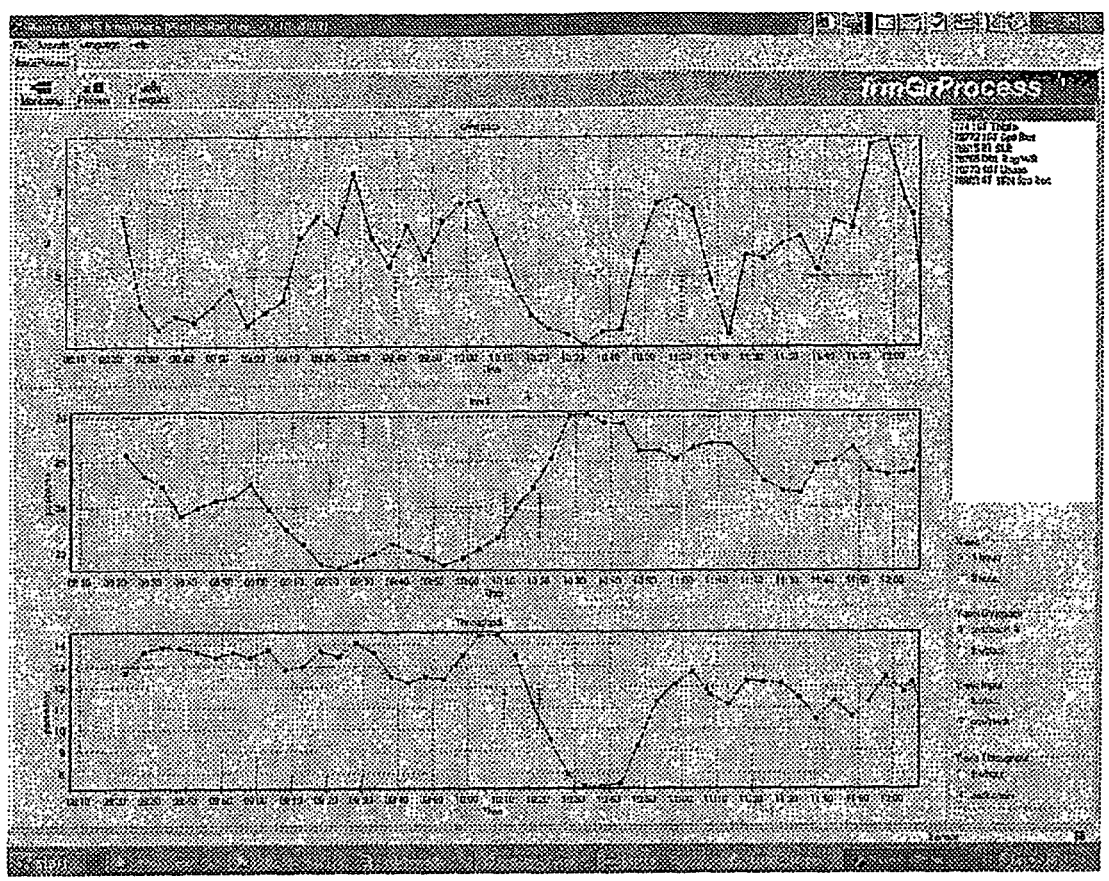
Figure 5:
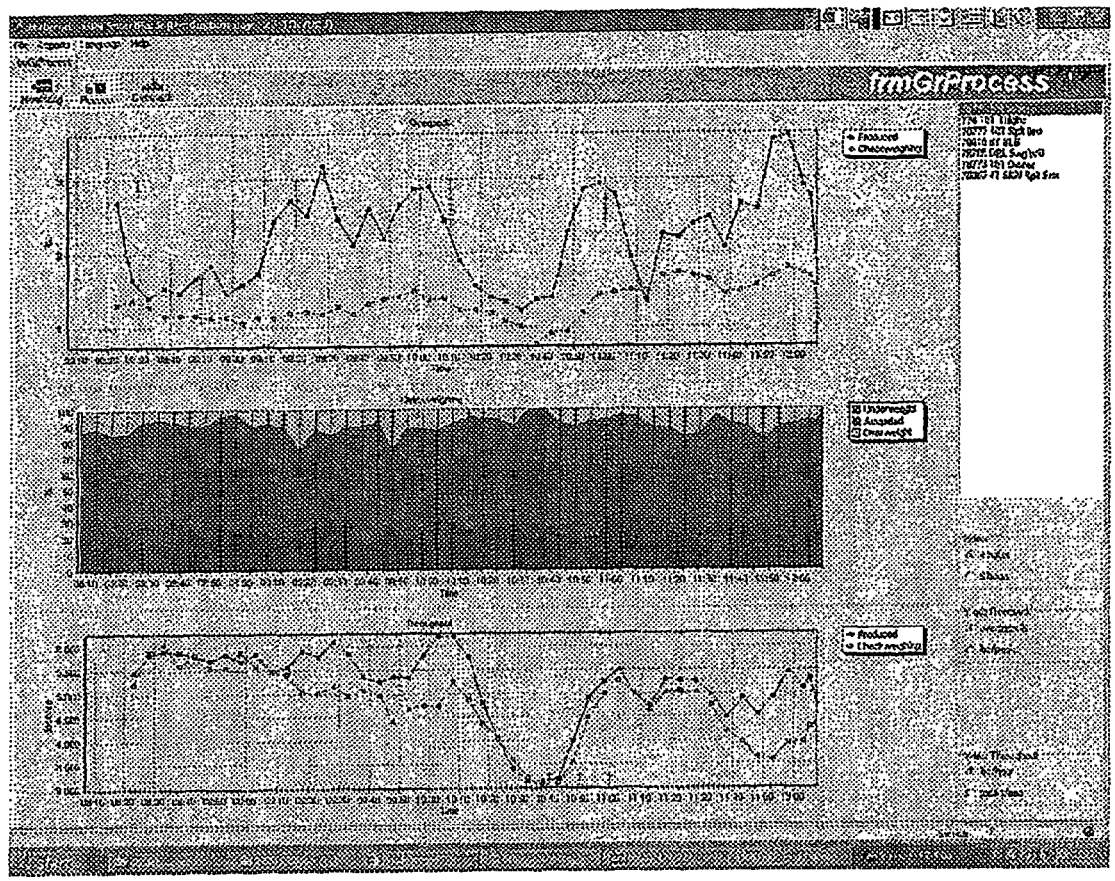

In the following, a preferred embodiment of the invention will be referred to in the term of a SmartPack system. The system will be described in further details with reference to the drawing in which:

FIG. 1 shows an integrated item batching and information handling system according to the invention, FIG. 2 shows a system overview, FIG. 3 shows an example of the real-time over-pack graphs, FIG. 4 shows an example of real-time monitoring graphs, FIG. 5 shows an example of real-time process graphs, and FIGS. 6-12 show various examples of reports and graphs.

FIG. 1 shows an integrated item batching and information handling system for producing batches of items. The system comprises a batching process flow line with a conveyor 1 conveying items 9, 11 in the direction of the arrow 2 from a dynamic scale or similar sensing means 10 towards batching means comprising rejecting arms 3 arranged along the conveyor for rejecting the items into the batch receptacles 4. As shown in FIG. 1, two items have been rejected from the conveyor into the receptacle with numeral 12. The weight of the receptacle is determined by a second sensing means in form or a static scale. The scale transmits weight related data via the connection 5 to the computer 6. The computer further receives weight related data from the first sensing means via the connection 7 and controls the rejecting arms via the connection 8. The computer is capable of generating sets of data representing characteristics of sets of items entering the intake, and corresponding characteristics expected for batches of the sets of items, and capable of processing the data and visualizing the data.

The SmartPack system monitors the evolution of overweight in batches—in the following text referred to as packs. It will enable an operator of the system to monitor and decide how to minimize overweight in packs that are currently running. An operator can choose to monitor the packs that are most important by value and therefore increase the pack margin.

FIG. 2 shows a system overview wherein a client computer system 20 of a batching system and a client computer system 21 of a check weight are connected to a server computer system 22 for passing data relating to the weight or relating to similar characteristics of items or batches via an Ethernet connection 23. Three client computers systems 24-26 are connected and provide operators with support in planning the batching process or support in detecting system faults. SmartPack provides two kinds of information, i.e. real-time graphs monitoring overpack and production, and historical reports providing different aspects of analyzing overpack. The option of simulating the theoretical baseline for a production is available. The difference between current overpack and the theoretical simulated overpack is the major opportunity for possible overpack reduction.

The user interface of the client computer systems 24-26 is in accordance with a standard architecture of the general computer interfaces of the batching system. The software has two different access levels, Operator and Administrator level. The SmartPack system has no adjustment or setup tables but only reports for monitoring, both historical and real-time.

An operator level of the user interface is intended for a production supervisor. It visualizes of the following real time graphs.

Overpack focusing on the total overweight of all packs being created and the possibility of identifying pack(s) that is significantly out of order.

Monitoring focusing on the process of creating packs from pieces.

Process focusing on the steps from packing to check-weighing.

Overpack shows two different real-time graphs. It has selection box for current packs in production and the user can select pack to be monitored. FIG. 3 shows example of the overpack monitoring graphs.

Overpack showing overpack in percentage or in weight/pack.

Total overpack showing summed overpack in percentage for all packs being created.

Monitoring shows three different real-time graphs. It has selection box for current packs in production and the user can select pack to be monitored. FIG. 4 shows example of the overpack monitoring graphs. Overpack showing overpack in % or weight/pack.

Input showing average weight of pieces in weight/piece or pieces/pack.

Throughput showing production rate of different packs in weight/hour or packs/min.

FIG. 5 shows a graphical view of data sets for an overpack process in three different real-time graphs. One selection box for current packs in production is for all the graphs. The user can select pack to be shown. Only one pack can be shown at a given time.

Overpack showing overpack both at the creation of the packs and at check-weighing in percentage or weight/pack.

Check-weighing showing rate of underweight packs, overweight packs and acceptable packs.

Throughput showing production rate of the packs at the creation of the pack, into check-weighing, and from check-weighing in weight/hour or packs/min.

The operator of the system can print out various reports selected from a report menu.

In the following, a number of reports will be described in further detail.

FIG. 6 shows a report called Production list. Production list helps the production manager to analyze the weights and rejects from the point of receiving individual pieces to the point delivering accepted trays. The report lists the following values for each product.

Total input weight into the packing system
    Total final weight accepted by the a person assigned to check the weights, i.e. a check-weigher
    Weight share representing the percentage of final weight for this product of total production final weight
    Total reject showing percentage difference between input weight and final weight
    Batch reject representing reject (under weights and over weights) at the Check-Bin grader
    Final reject representing reject at the check-weigher FIG. 7 shows a report called Overpack list. Overpack list gives a summary of net weight packs produced. The report lists the following values for each product.

Total boxes produced of this product
    Total packs produced of this product
    Total weight of product produced
    Total overpack of product produced
    Nominal weight of product (net weight)
    Overpack on average for each pack produced
    Overpack percentage for each pack
    Pieces per pack on average FIG. 8 shows a report/graph called Overpack correlation. Overpack correlation plots all process periods for the selected product on a scatter graph. The x-axis represents average pieces per pack during the process period. The y-axis represents overpack percentage for the process period. Yellow dot is the current process period (still open), red dots are process periods completed today, and green dots are process periods from yesterday or older. The red line is the best fitted line through all the dots plotted.

Figure 9:
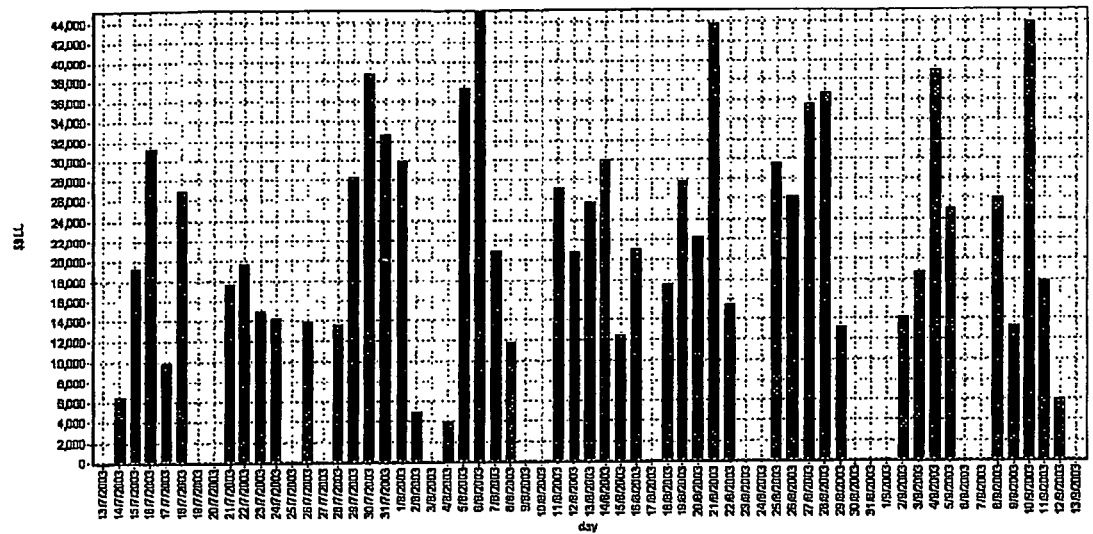

FIG. 9 shows a report/bar graph called Throughput history. Each bar represents the production volume for a given time period (day, week, month). This report is used for tracking the volume of production for products.

Figures 10, 11:
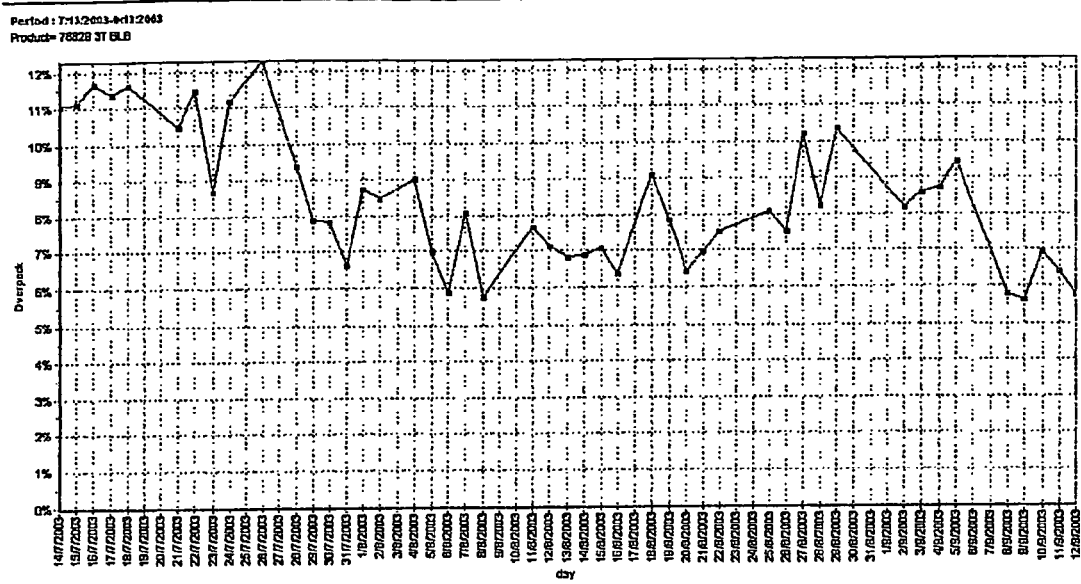

FIG. 10 shows a report/graph called Overpack history. Each dot represents the overpack during a given time period (day, week, month). This report shows the trend of overpack for products.

FIG. 11 shows a report called Overpack comparison. This report is used for comparing the overpack on the Check-Bin grader and the overpack on the Check-weigher. The report lists the following values for each product.

Batch overpack, both weight and percentage. This is the overpack from the Check-Bin grader, where pieces are collected into fixed weight batches.
    Final overpack, both weight and percentage. This is the overpack from the Check-weigher for accepted packs
    Difference between final and batch overpack, both weight and percentage.

FIG. 12 shows a report called Product by period. For a given product, this shows all process periods that have been created. This helps to pick out specific process periods with exceptionally good or bad results to analyze further in other MPS modules. The report lists the following values for each product.

Process period number.
    Process unit, the Check-Bin grader or Check-weigher used.
    Date and time for the start and end of process period
    Batch/Pack count for the process period
    Final weight for the process period
    Average overpack during the process period

The invention claimed is:

1. An integrated item batching and information handling system for producing batches of items, said system comprising:

a process flow line with item batching means arranged between an item intake and at least one batch receptacle,
    a computer,
    first sensing means capable of transmitting electronic signal to said computer for establishing a first set of data representing characteristics of items entering the intake, and
    second sensing means capable of transmitting electronic signal to said computer for establishing data representing characteristics of batches from at least one batch receptacle, wherein said computer receives said first set of data from said first sensing means and is configured to generate a second set of data representing the characteristic of expected Items entering the intake, and is further configured to generate a third set of data representing the characteristics of expected batches from said expected items, and receives a fourth set of data from the second sensing means representing the characteristics of the actual batches, characterized in that the computer is configured to generate a fifth set of data representing characteristics of a set of imaginary items, and corresponding conditions of batches expected from a theoretically ideal batching of said fifth set of data, and wherein, based on said sets of data, said information handling system presents the result for batches on demand and recommends the optimal one to the operator or controls the batching system automatically.

2. A system according to claim 1, wherein the computer comprises one central processing unit receiving data from the first and the second sensing means.

3. A system according to claim 1 wherein the computer comprises additional processing units connected between at least one of the sensing means and the central processing unit.

4. A system according to claim 1, further comprising a data storage means and data entering means allowing entering of data sets into the data storage means.

5. A system according to claim 1, comprising a conveyer for conveying the items from the intake passed the first sensor and the batching means to the at least one batch receptacle.

6. A system according to claim 5, wherein the computer is adapted to generate and compare data sets during the conveying of items.

7. A system according to claim 1, wherein at least one of the first and second sensing means comprises a scale for determining data representative of a weight of an item or batch receptacle.

8. A system according to claim 1, wherein the computer is adapted generate a correlation between two of the first, second, third and fourth sets of data.

9. A system according to claim 1, wherein the computer is adapted to visualize at least one of the first, the second, the third and the fourth sets of data graphically on a screen.

10. A system according to claim 1, wherein the computer is adapted to visualize a correlation between two or more of the first, second, third and fourth sets of data.

11. A system according to claim 9, wherein the computer is adapted to visualize more than one data set or more than one correlation In a single screen image.

12. A system according to claim 1, wherein at least one of the second and the third sets of data represent one of:
    an average weight of the first set of items, and
    a standard deviation of the first set of items,
and one of:
    a corresponding average overweight expected for batches of the first set of items, and
    a number of batches expected to have an underweight.

13. A system according to claim 1, wherein at least one of the first and fourth sets of data represents one of:
an average weight of the first set of items, and
a standard deviation of the first set of items.

14. A system according to claim 1, wherein the computer system comprises data input means allowing a user to enter data into at least one of the second, third and fourth sets of data.

15. A system according to claim 1, wherein the computer system is adapted to recalculate expected conditions of batches based on the second and third sets of data based on a user request.

16. A method of analyzing process data in a batching process of an integrated item batching and information handling system of the kind comprising a process flow line with item batching means arranged between an item intake and at least one batch receptacle, first sensing means for establishing data representing characteristics of items entering the intake, and second sensing means for establishing data representing the characteristics of the batches, said method comprising the steps of
conveying items between an item intake and at least one batch receptacle in an item processing line,
establishing first set of data representing characteristics of Items entering the intake, and
generating a second set of data representing characteristics or expected items entering the intake, and
generating a third set of data, representing the characteristics of expected batches from said expected items, and
receiving data from said second sensor, and establishing a fourth set of data, representing the actual conditions of batches, and
generating, via a computer, a fifth set of data of imaginary items,
calculating, via the computer, theoretically ideal batches,
wherein said theoretically ideal batches are calculated from said imaginary items contained in said fifth set of data.

17. A method according to claim 16, further comprising generating a correlation between two of the second, third, fourth and fifth sets of data.

18. A method according to claim 16, further comprising visualising at least one of the second, the third, the fourth and the fifth sets of data graphically on a screen.

19. A method according to claim 16, further comprising visualising a correlation between two or more of the second, third, fourth and fifth sets of data.

20. A method according to claim 17, wherein more than one data set or more than one correlation is visualized in a single screen image.

21. A method according to claim 17, wherein the data represents weights of the items and batches.

* * * * *